(12) United States Patent
Shapira

(10) Patent No.: US 9,302,784 B2
(45) Date of Patent: Apr. 5, 2016

(54) FOREIGN OBJECT DEBRIS BARRIER FOR RUNWAYS

(71) Applicant: Ivry Shapira, Oranit (IL)

(72) Inventor: Ivry Shapira, Oranit (IL)

(*) Notice: Subject to any disclaimer, the term of this patent is extended or adjusted under 35 U.S.C. 154(b) by 0 days.

(21) Appl. No.: 14/721,092

(22) Filed: May 26, 2015

(65) Prior Publication Data

US 2015/0314887 A1 Nov. 5, 2015

Related U.S. Application Data

(62) Division of application No. 13/816,274, filed as application No. PCT/IL2011/000616 on Jul. 31, 2011.

(30) Foreign Application Priority Data

Aug. 12, 2010 (IL) .......................................... 207600

(51) Int. Cl.
| | | |
|---|---|---|
| *E01F 9/018* | (2006.01) | |
| *B64F 1/36* | (2006.01) | |
| *B64F 1/20* | (2006.01) | |
| *B64F 1/00* | (2006.01) | |

(52) U.S. Cl.
CPC ... *B64F 1/36* (2013.01); *B64F 1/00* (2013.01); *B64F 1/20* (2013.01)

(58) Field of Classification Search
USPC ..................................... 404/7, 10; 244/114 R
IPC ..................... E01F 9/018; B64F 1/36
See application file for complete search history.

(56) References Cited

U.S. PATENT DOCUMENTS

| | | | |
|---|---|---|---|
| 1,833,124 A | | 11/1931 | Rand |
| 2,116,426 A | * | 5/1938 | Cecil ................................ 472/92 |
| 2,792,164 A | | 5/1957 | Cauffiel |
| 2,994,255 A | * | 8/1961 | Trief et al. ......................... 404/7 |
| 4,521,129 A | | 6/1985 | Krech |
| 4,534,673 A | | 8/1985 | May |
| 4,915,293 A | | 4/1990 | Paramski |
| 4,982,931 A | * | 1/1991 | Pomero ......................... 256/13.1 |
| 5,090,588 A | | 2/1992 | Van Romer et al. |
| 5,639,179 A | | 6/1997 | Jensen |
| 6,301,831 B1 | | 10/2001 | Cundy et al. |
| 7,100,903 B1 | | 9/2006 | Wilson |
| 8,734,048 B1 | | 5/2014 | Driskell et al. |
| 2013/0140400 A1 | * | 6/2013 | Shapira ..................... 244/114 R |

FOREIGN PATENT DOCUMENTS

EP 1490552 12/2004

OTHER PUBLICATIONS

US Notice of Allowance for U.S. Appl. No. 13/816,274, dated Nov. 2, 2015.

* cited by examiner

*Primary Examiner* — Gary Hartmann
(74) *Attorney, Agent, or Firm* — Pearl Cohen Zedek Latzer Baratz LLP

(57) ABSTRACT

The invention relates to the safety of airport runways.
The invention provides a side bather preventing foreign object debris (FOD) from entering a runway and taxiway and endangering aircraft.
The barrier having ground attachment means and being constructed to collapse if the landing wheels of an aircraft impact the barrier and thus allow the aircraft to safely continue landing/takeoff/taxiing.

8 Claims, 6 Drawing Sheets

FOREIGN OBJECT DEBRIS BARRIER FOR RUNWAYS

CROSS-REFERENCE TO RELATED APPLICATIONS

This application is a Divisional of U.S. patent application Ser. No. 13/816,274, filed Feb. 11, 2013, which is a National Phase Application of PCT International Application No. PCT/IL2011/000616, International Filing Date Jul. 31, 2011, claiming priority of Israeli Patent Application No. 207600, filed Aug. 12, 2010, which are hereby incorporated by reference.

BACKGROUND OF THE INVENTION

The present invention relates to the safety of airport runways.

More particularly, the invention provides a side barrier preventing foreign object debris (FOD) from entering a runway and taxiway and endangering aircraft.

The importance of keeping airport runways and taxiways clear of FOD is well known.

An important consideration requiring attention is that the large diameter engines used by jet aircrafts are most often located under the aircraft wings, thus bringing the engine intake perilously close to ground level. As aircraft jet engines can be severely damaged on ingestion of even small solid particles, a clean runway is needed to ensure the safe operation of the engines, particularly during take-off.

The arrival of FOD on a runway or taxiway is often due to winds or wind caused by jet blast which collect FOD from an outside area. After the wind abates and before any airplane is cleared for take-off a clean-up crew may be sent to clear the runway for both incoming and outgoing aircraft. The resultant delays can have a ripple effect on other flights resulting in angry passengers and much fuel wastage as incoming aircraft circle the airport in a holding pattern.

While it may appear at first glance that the erection of a FOD barrier on each side of a runway is a simple matter, it must be realized that under various circumstances (pilot error, fog, under carriage malfunction, a collision avoidance maneuver etc.) an aircraft may fail to adhere to the line marking the runway center and collide with the FOD barrier. If the barrier is rigid such a collision is likely to result in loss of life, injuries and a wrecked aircraft.

Accordingly Prevost in US Patent application 2008/0175665, and U.S. Pat. Nos. 7,207,742 7,223,047 and 7,677,833 discloses an arrangement wherein a downward slope is created adjacent to each side of the runway. A water impermeable material covers the slope, at the bottom of which a line of artificial grass is to collect FOD driven by jet blasts and water run-off from the runway. The drawbacks of this system include the difficulty of cleaning the artificial grass and the high cost of creating two or 3 levels where only one level—the surface of the runway—exists presently.

SUMMARY OF THE INVENTION

It is therefore one of the objects of the present invention to obviate the disadvantages of prior art methods of clearing a runway and taxiways and to provide a side bather which stops and reduces FOD before it can reach the runway and endanger aircraft thereon.

It is a further object of the present invention to provide a collapsible barrier which will cause no damage to an aircraft colliding therewith.

Yet a further object is to retain the FOD and allow for its collection or removal in an orderly manner.

Yet another object is to easily clean the runway from FOD without blocking it by the barrier.

Finally it is an object of the present invention to provide a barrier of aerodynamic characteristics.

The present invention achieves the above objects by providing a runway side barrier for preventing foreign object debris (FOD) from entering a runway used by aircraft, said barrier having ground attachment means and being constructed to collapse if the landing wheels of an aircraft impact said barrier and thus allow said aircraft to safely continue landing/takeoff/taxiing.

In a preferred embodiment of the present invention there is provided a barrier being provided with a plurality of rows of ground attachment items.

In a further preferred embodiment of the present invention there is provided a barrier being made of an elastomer, the height of said barrier being temporarily reduced by at least 80% when compressed by said landing wheels of said aircraft.

In another preferred embodiment of the present invention there is provided a barrier being made of a rigid material, the barrier profile including break points allowing collapse of said profile under pressure of an aircraft landing wheel.

In a further preferred embodiment of the present invention there is provided a barrier wherein the barrier profile includes at least one opening which can be accessed for cleaning from a moving vehicle by use of standard cleaning tools and can be accessed by a robot or a cleaning person moving in a direction parallel to said barrier.

In a further preferred embodiment of the present invention there is provided a barrier further provided with drainage channels disposed between ground attachment means.

In yet a further preferred embodiment of the present invention there is provided a barrier further provided with support means for a row of spaced-apart landing lights disposed along the length thereof.

In another preferred embodiment of the present invention there is provided a barrier wherein means are provided for varying the height thereof.

In a most preferred embodiment the barrier is aerodynamic having one side convex while the other being concave.

The invention further comprises two methods for manufacturing and installing the barrier described herein.

In a first method of the present invention of installing a runway side barrier for FOD spaced-apart fold relief recesses are provided therealong, allowing said barrier to be transported from the manufacturer to an airport in a compact folded form.

In a second method provided by present invention a barrier is installed after being manufactured in discrete lengths for convenient storage and transport. One extremity of each length is formed in a hollow configuration to engage the unformed extremity of an adjacent length when deployed at the side of a runway.

It will thus be realized that the novel device of the present invention serves not only to stop FOD being blown onto the runway but also allows orderly collection, cleaning or removing thereof.

A very important feature of all embodiments of the invention is that even if the aircraft hits the barrier for whatever reason, the barrier will collapse and allow the landing wheel to crush the barrier without causing damage to the aircraft.

The invention shows how the barrier may be constructed using a wide variety of materials—steel, aluminium, rubber and plastics.

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

DETAILED DESCRIPTION OF THE INVENTION

Figure 1:
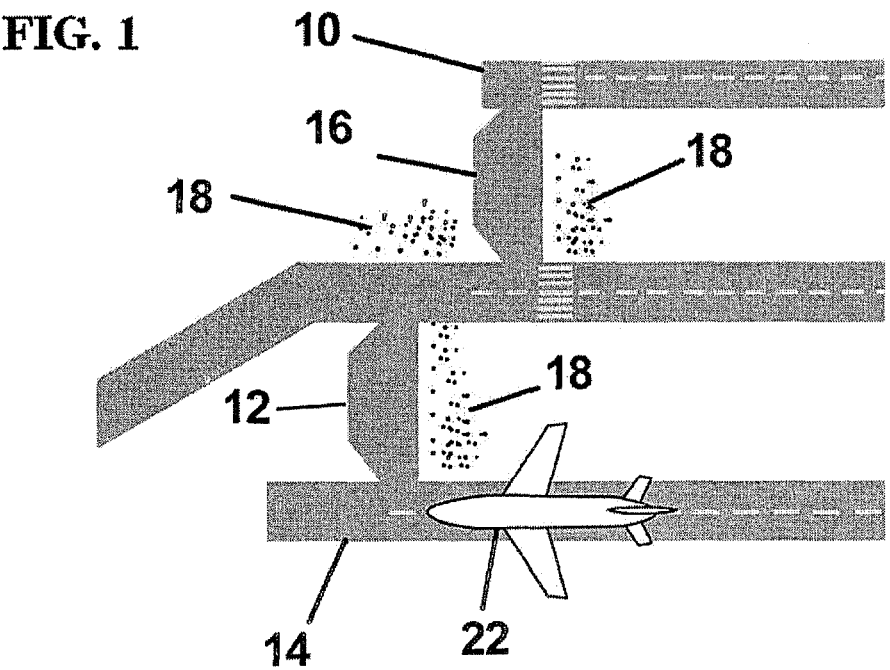
FIG. 1 is a plan view of runways in a present-day airport.
Figure 3:
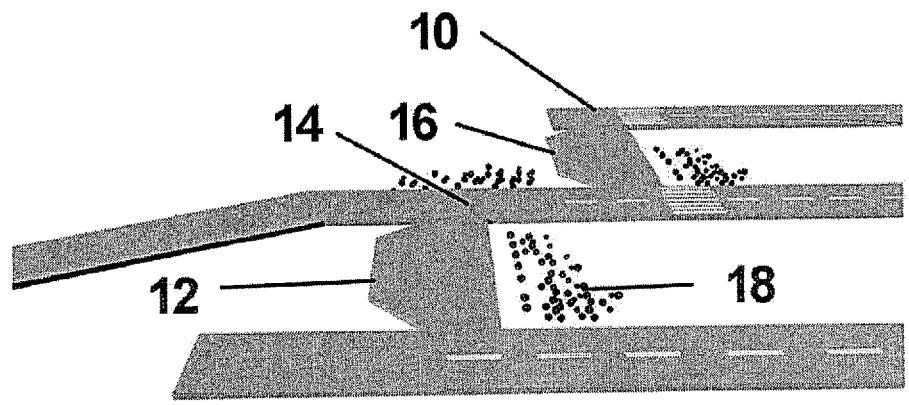
FIG. 3 is a perspective view of the runways seen in FIG. 1.

There are seen in FIGS. 1 and 3 several runways 10, 14 typical of those found in a present-day airport. FOD 18 is seen accumulating near the runways 10, 14. These runways are interconnected by parking/taxing areas 12, 16 used by aircraft 22 waiting for permission to take off.

Figure 2:
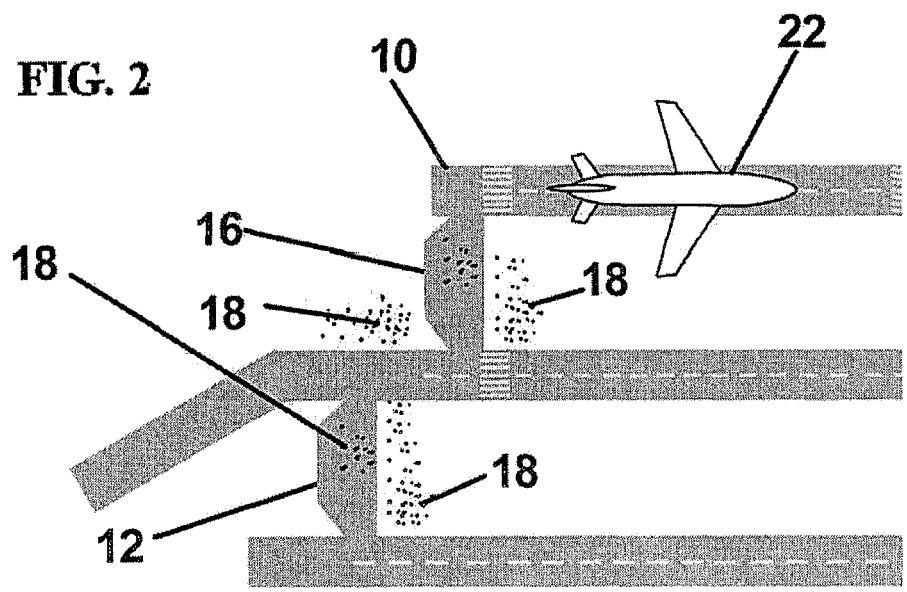
FIG. 2 is a further plan view the same airport, showing FOD encroaching on a runway of said airport.
Figure 4:
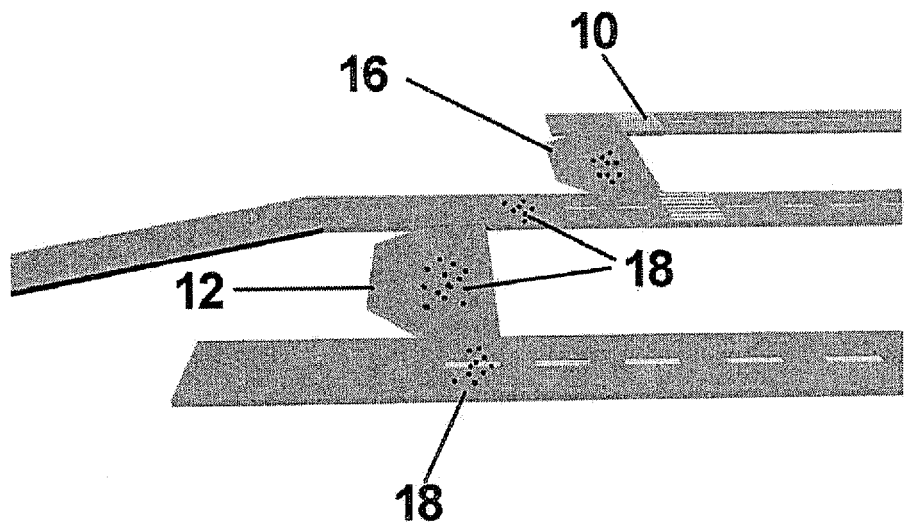
FIG. 4 is a perspective view of the runways seen in FIG. 2.

The runways are clean, no FOD is encroaching on a runway of said airport; In FIGS. 2 and 4 the same runways are seen, with FOD encroaching on parking areas 12, 16 and runways.

Figure 5:
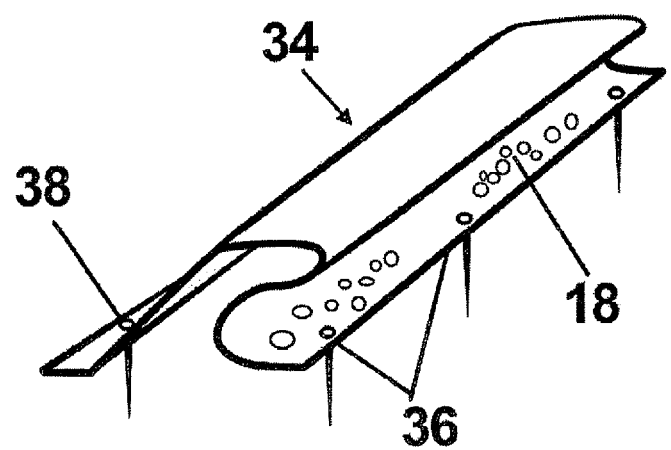
FIG. 5 is a perspective view of a sheet metal embodiment, or any other material.

A preferred embodiment of the FOD barrier, to be installed on both sides of the runways according to the invention is seen in FIG. 5 and is made of sheet metal or any other suitable material. The barrier 34 is provided with two rows 36 38 of ground attachment items. If crushed by an aircraft 22 landing wheel, the damaged portion of the barrier 34 is discarded and replaced. Preferably the shape being aerodynamic profile— one side of the barrier the "FOD collection side" concave to enable stopping FOD from entering the runway and the other side of the bather, having a convex shape.

Figure 6:
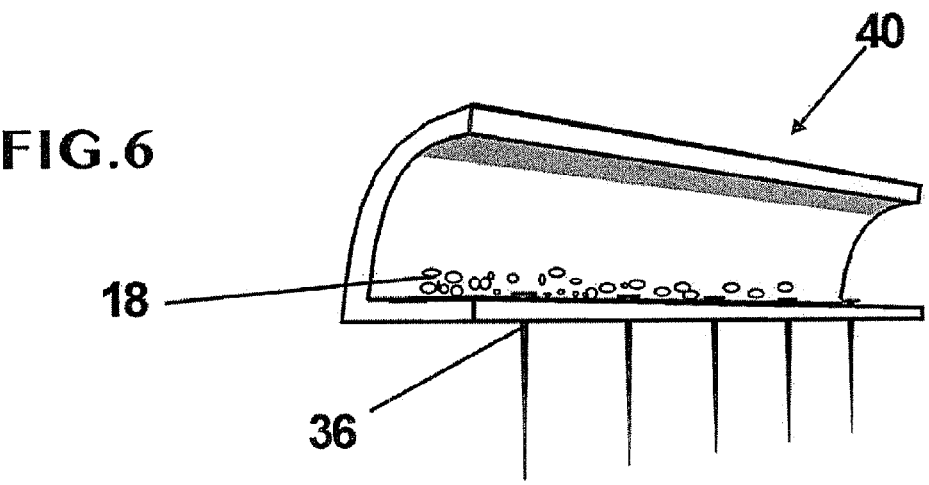
FIG. 6 is a perspective view of an embodiment made from an aluminium extrusion.

The barrier embodiment 40 seen in FIG. 6 can be produced as an aluminium extrusion or rubber of about 350 mm is sufficient. As such, the present embodiment 40 can be produced at low cost but will need replacement if crushed by the landing wheel of an aircraft.

Figure 7:
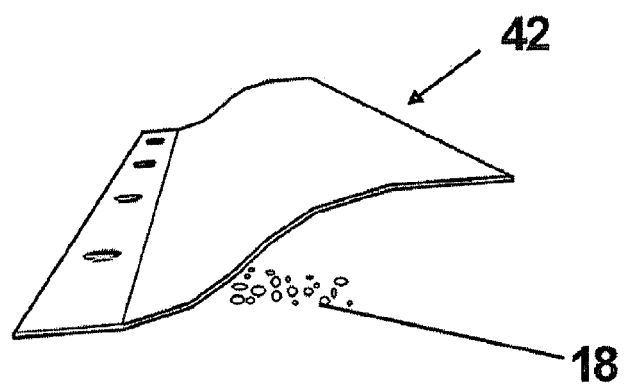
FIG. 7 is a perspective view of a further sheet metal embodiment.
Figure 8:
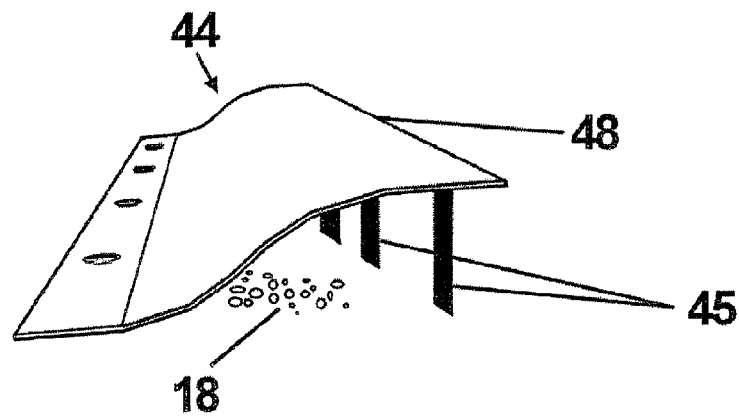
FIG. 8 is a perspective view of a further similar embodiment provided with struts.
Figure 9:
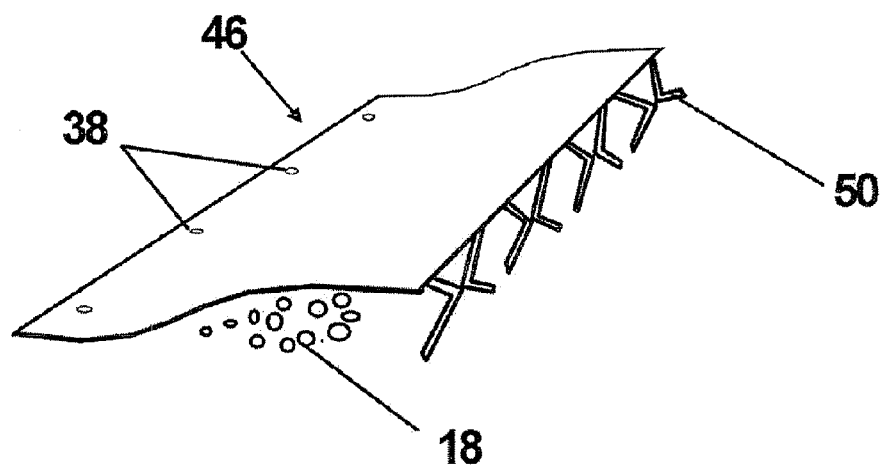
FIG. 9 is a perspective view of a further similar embodiment provided with struts which are configured to collapse.

FIGS. 7, 8 and 9 illustrate further embodiments 42, 44 and 46.

The embodiment 42 seen in FIG. 7 is a simple low-cost barrier which collapses easily and is thus suitable for a runway serving light aircrafts.

The embodiment 44 seen in FIG. 8 is provided with support pillars 45. The pillars 45 are driven into the soil if compressed by the passage thereover of a landing wheel. Thus there is a possibility of reusing the damaged section by repositioning the edge 48 upwards.

In contradistinction thereto the supports 50 provided in the embodiment 46 seen in FIG. 9 are intended to break when compressed and are replaced thereafter.

Figure 10:
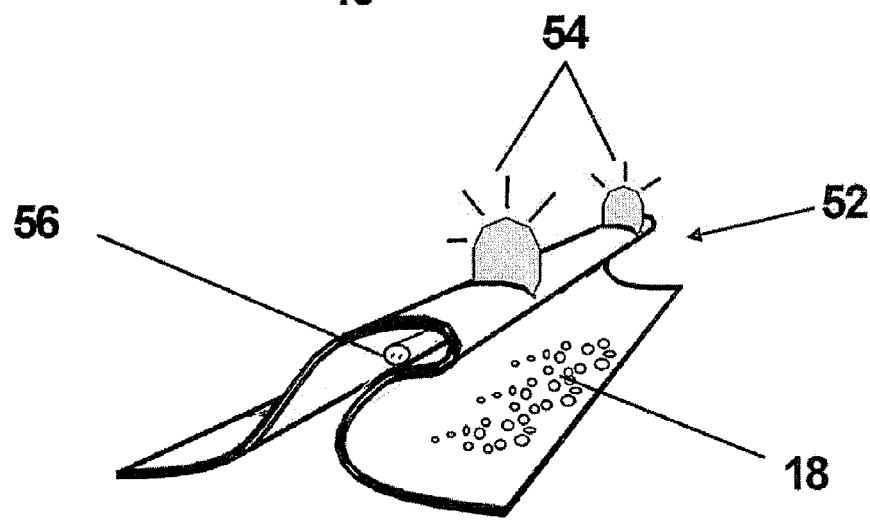
FIG. 10 is a perspective view of a barrier supporting landing lights.

Referring now to FIG. 10, there is depicted a barrier 52 further provided with support means for a row of spaced-apart landing lights 54 disposed along the length thereof. The sheet metal profile provides a convenient protective housing for the electric cable 56 providing power to the lights 54.

Figure 11:
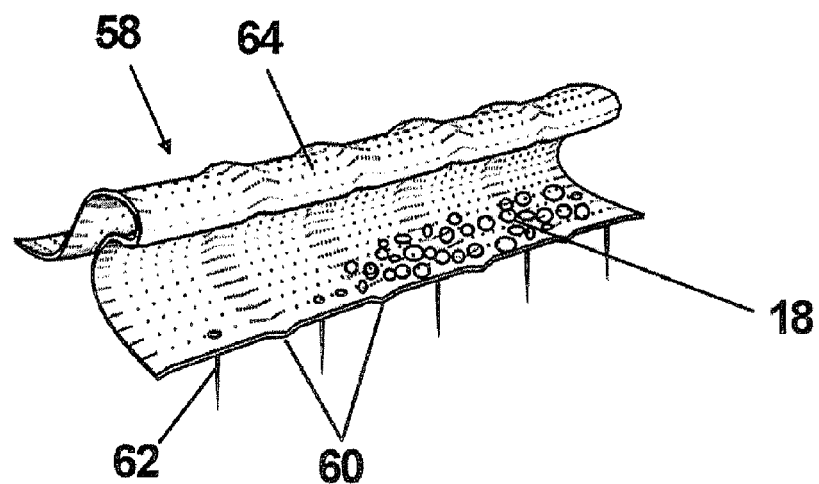
FIG. 11 is a perspective view of an embodiment allowing drainage.

In FIG. 11 there is seen a FOD bather 58 further provided with drainage channels 60 disposed between ground attachment means 62. This drainage is useful in preventing standing water on the runway resulting from rain, washing of aircraft or the operation of fire extinguishers.

The barrier 58 seen is made of perforated metal 64 to allow drainage and to facilitate collapse when compressed by a landing wheel. Alternatively, other permeable materials may be used, such as recycled rubber.

Figure 12:
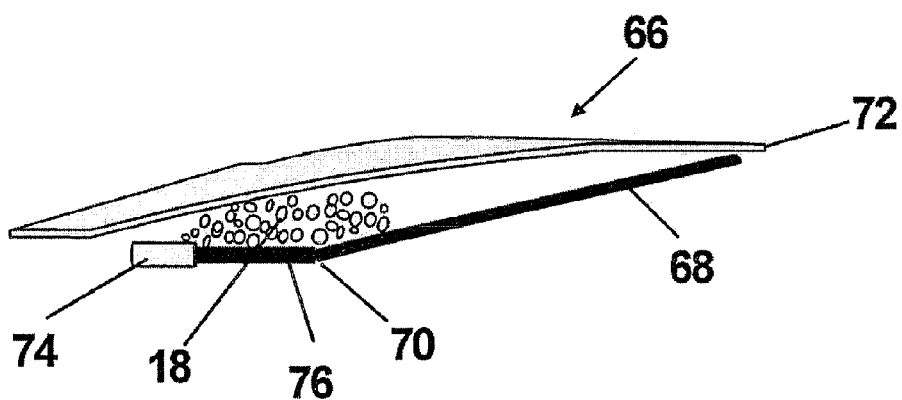
FIG. 12 is a perspective view of an adjustable embodiment seen in a low position.
Figure 13:
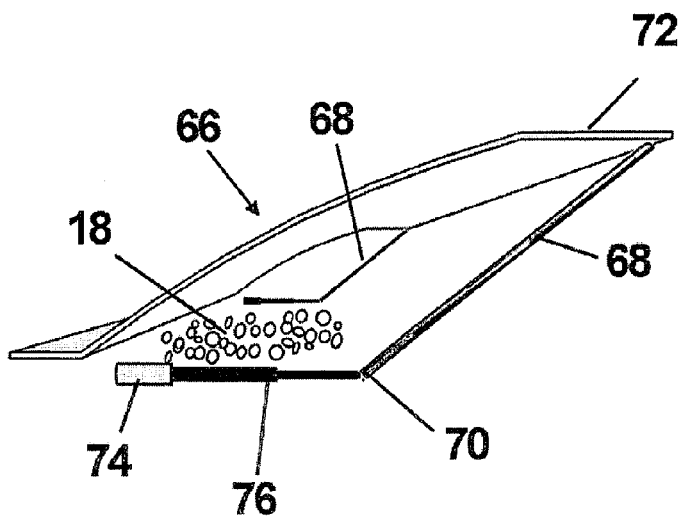
FIG. 13 is a perspective view of the same adjustable embodiment seen in a high position.

Turning now to FIGS. 12 and 13, there is seen a barrier 66 wherein hinged struts 68 are provided and are pivoted at 70 proximate to the upper edge 72 of the barrier 66. A fixed actuator 74 is held substantially at ground level. An telescopic arm 76 forms part of the strut 68 near the fixed actuator 74. The actuator 74 can shorten the strut 68 as in FIG. 12 for lowering the barrier 66, or lengthen the strut 68 as in FIG. 13 to raise the barrier 66.

Where it is foreseen that the profile height is to be set once only, the appropriate actuator 74 is a screw and nut arrangement which is hand set on installation to bring the barrier 66 to a chosen height.

However where it is intended to regularly change the height of the barrier 66 the actuator 74 comprises a screw and nut mechanism operated by a reversible direction electric motor. A central control station to operate the height adjustment mechanisms can be located in the control tower.

The actuator 74 may comprise a fluid power cylinder. The actuators 74 can be remotely operated from the control tower.

Height adjustability is advantageous where a lower position as in FIG. 12 is needed for small aircraft, while a higher barrier as seen in FIG. 13 is suitable for large aircraft.

Figure 14:
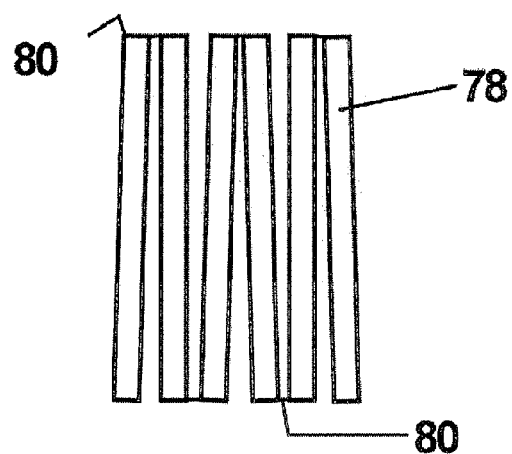
FIG. 14 is a view of a foldable embodiment.

FIG. 14 refers to a first method of installing an elastomer runway side barrier 78 against FOD. Spaced-apart fold relief recesses 80 are provided therealong, allowing the barrier 78 to be folded and stored, and then transported from the manufacturer or vendor to an airport in the compact folded form seen in the figure.

Figure 15:
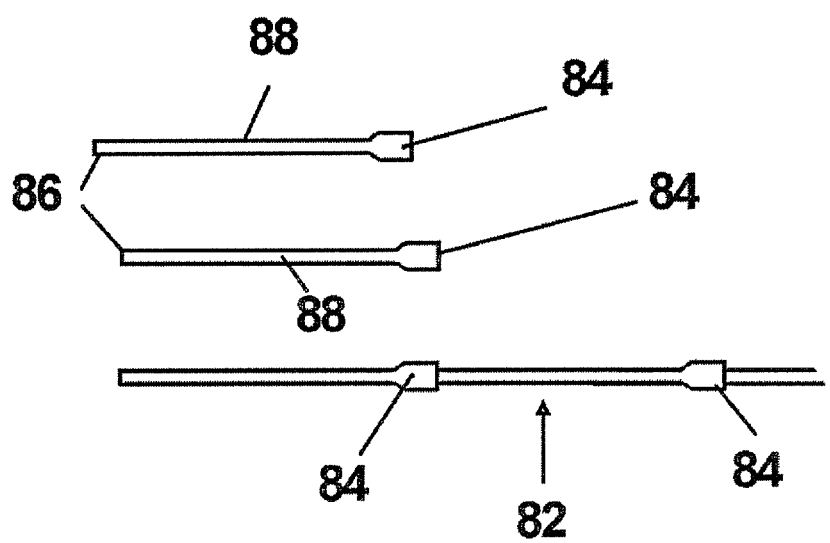
FIG. 15 is a view of an embodiment comprising discrete joinable lengths.

With regard to FIG. 15 there is illustrated a barrier 82 which is used in combination with a second improved method of installation.

The invention provides a method of installing a runway side barrier 82. The barrier is manufactured in discrete lengths 88 for convenient storage and transport. One extremity 84 of each length is formed in a hollow configuration to engage the unformed extremity 86 of an adjacent length when deployed at the side of a runway.

Due to its construction and profile the removing of FOD which accumulated therealong is performed by ordinary cleaning tools know in the art.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

I claim:

1. A collapsible runway side barrier for preventing foreign object debris (FOD) from entering a runway or taxiway, wherein said runway side barrier has an aerodynamic profile; wherein one side of the barrier is convex while another side is concave; said runway side barrier comprising a plurality of replaceable support elements, said support elements located on the concave side of said barrier, wherein said support elements are adapted to break when compressed by a landing wheel of an aircraft.

2. The barrier as claimed in claim 1, further comprising at least one row of ground attachment means.

3. The barrier as claimed in claim 1, wherein the barrier is made of an elastomer, the height of said barrier being temporarily reduced by at least 80% when compressed by said landing wheels of said aircraft.

4. The barrier as claimed in claim 1, wherein the barrier is made of a rigid material, and wherein the barrier profile includes break points allowing collapse of said profile under pressure of an aircraft landing wheel.

5. The barrier as claimed in claim 1, wherein the barrier profile includes at least one opening defined by said concave side of the barrier adapted to retain said foreign object debris.

6. The barrier as claimed in claim 2, further comprising drainage channels disposed between the ground attachment means.

7. The barrier as claimed in claim 1, further comprising support means for a row of spaced-apart landing lights disposed along the length thereof; and wherein the profile of said barrier accommodates an electric cable providing power to the landing lights.

8. The barrier as claimed in claim 1, wherein said barrier further comprises at least one hinged strut, said at least one hinged strut comprises a fixed actuator, held substantially at ground level, and a telescopic arm for varying the height of said barrier.

* * * * *